Feb. 2, 1971 J. H. ANDERSEN ET AL 3,560,968

LIGHTED PUSHBUTTON

Filed May 4, 1967 7 Sheets-Sheet 1

INVENTORS
JAMES H. ANDERSEN
ANTHONY R. FORD
ALVIN FRANKLIN
HOWARD M. SIEGEL
BY Nolte & Nolte
ATTORNEYS Feb. 2, 1971 J. H. ANDERSEN ET AL 3,560,968

LIGHTED PUSHBUTTON

Filed May 4, 1967 7 Sheets-Sheet 2

INVENTORS
JAMES H. ANDERSEN
ANTHONY R. FORD
ALVIN FRANKLIN
HOWARD M. SIEGEL
BY Nolte & Nolte
ATTORNEYS INVENTORS
JAMES H. ANDERSEN
ANTHONY R. FORD
ALVIN FRANKLIN
HOWARD M. SIEGEL
BY Nolte & Nolte
ATTORNEYS

LIGHTED PUSHBUTTON

INVENTORS
JAMES H. ANDERSEN
ANTHONY R. FORD
ALVIN FRANKLIN
HOWARD M. SIEGEL
BY Nolte & Nolte
ATTORNEYS

LIGHTED PUSHBUTTON

Filed May 4, 1967 7 Sheets-Sheet 5

INVENTORS
JAMES H. ANDERSEN
ANTHONY R. FORD
ALVIN FRANKLIN
HOWARD M. SIEGEL
BY Nolte & Nolte
ATTORNEYS INVENTORS
JAMES H. ANDERSEN
ANTHONY R. FORD
ALVIN FRANKLIN
HOWARD M. SIEGEL
BY Nolte & Nolte
ATTORNEYS

LIGHTED PUSHBUTTON

Filed May 4, 1967 7 Sheets-Sheet 7

INVENTORS
JAMES H. ANDERSEN
ANTHONY R. FORD
ALVIN FRANKLIN
HOWARD M. SIEGEL
BY Nolte & Nolte
ATTORNEYS United States Patent Office 3,560,968

Patented Feb. 2, 1971

3,560,968

LIGHTED PUSHBUTTON

James H. Andersen, Cheshire, Conn., and Anthony R. Ford, Covina, and Alvin Franklin, Whittier, Calif., and Howard M. Siegel, Long Beach, N.Y., assignors, by mesne assignments, to Unimax Switch Corporation, a corporation of Connecticut Filed May 4, 1967, Ser. No. 636,214
Int. Cl. G09f *9/00*
U.S. Cl. 340—381 24 Claims

ABSTRACT OF THE DISCLOSURE

A pushbutton, adapted to provide a signal upon depression of the frontwardly extending lens assembly, is mounted on a panel by means of a multilegged clamping member. To mount the device, the clamp is axially displaced toward the rear panel surface by single lead screw disposed within the pushbutton housing. The screw is accessible from the front of the panel. The lamp and lens assembly contain individually spring biased lamps and is removed as a single unit by a series of separate steps including first pulling out the lens assembly until a stop is reached, pushing in the lens assembly until a second stop is reached and then pulling the lens and lamp assembly out of the housing. Internal bussing provides electrical connection between selected lamp terminals.

This invention relates generally to panel mounted instruments and more particularly to improved structure in lighted pushbutton indicators, switches or the like.

In the art that includes panel mounted lighted pushbuttons and pushbutton switches, the present invention provides structural and functional improvements in the following several areas.

(I)—Panel mounting structure
(II)—Lamp mounting structure
(III)—Relamping structure and method
(IV)—Internal bussing for lamp terminals Each of the categories mentioned above will now be described briefly and then in greater detail in conjunction with the drawing.

(I) PANEL MOUNTING

An elongated, hollowed housing is provided with a peripheral flange about the open, front end thereof. In the illustrated embodiment, the housing is rectangular and the opening in the panel is substantially the same as the dimensions of the major portion of the housing. The flange, however, is somewhat larger than the body of the housing so that the instrument may be inserted from the front of the panel. The enlarged flange abuts the front surface of the panel and prevents further inward movement of the housing. A plurality of fingers extend substantially parallel to the sides of the housing on the outside thereof and are joined at a common internal base that is threadably mounted on a lead screw journalled rotatably in the hollow housing. By inserting an appropriate tool, into the open end of the housing, such as a screwdriver, the lead screw may be turned from the front of the panel and the clamping fingers brought up alongside the outside of the housing in order to abut the ends thereof with the rearward surface of the mounting panel. It will be appreciated that this aspect of the present invention provides means to accommodate a wide range of panel thicknesses. No specialized tools, skills or procedures are required to either insert or remove the switch housing from the panel. The panel is securely gripped on the front side by means of the flange and on the rear side by means of rigid fingers that move axially in a straight line.

(II) LAMP MOUNTING STRUCTURE

Each of the four lamps is removably mounted in individually spring loaded sleeves. Because the lamp holders are spring loaded rather than the terminals a more compact terminal arrangement is possible. The forces due to external shocks are absorbed by the sleeves rather than the lamps. In addition, because of the construction of this invention solder is not applied to any moving parts.

(III) RELAMPING STRUCTURE AND METHOD

When it is necessary to replace defective lamps, the front lens assembly, together with the lamp assembly, is removed with a pull-push-pull motion. An elongated shaft is secured to the rearward or inner side of the lens assembly. In the fully assembled condition, a plurality of balls are initially captured in an annular recess formed in a fixed and nonaxially movable part of the switch assembly and a plurality of apertures formed in the wall of a tubular member that is removable together with the lens and lamp assembly. The balls rest on the outside diameter of a sleeve that is interposed between the tubular member and the shaft that supports the lens assembly.

When the lens assembly is initially pulled in a direction away from the panel, the balls are transferred to an annular seat that is formed on an extension to the shaft supporting the lens assembly. This axially outward movement of the lens and lamp assembly results in a slight, radially inward movement of the balls. By pushing axially on the outside of the lens assembly, that is towards the panel, the balls are once again transferred radially inward so that they ride on the outer surface of the shaft supporting the lens assembly. The balls at this time are disposed below the annular seat in the fixed member. The lens assembly may now be pulled outwardly, carrying with it the balls, the sleeve with the apertures therein as well as the sleeve that is telescoped about the shaft supporting the lens and lamp assembly.

(IV) INTERNAL BUSSING

In order to obviate the need for costly jumper wires and the soldering thereof, and in order to reduce or remove the problems inherent with soldering, internal bussing members are provided. As many as six solder connections can be eliminated in a conventional circuit. Various portions of the bussing members may be isolated from each other depending upon the requirements of the circuit. It will be apparent that substantial saving in installation and replacement wiring costs are thereby provided by means of the present structure.

With regard to the panel mounting structure of the present invention, it should be noted that the closest prior art known to the applicants at this time is described in U.S. Pat. 3,233,299, granted on Feb. 8, 1966 to S. Godel. Therein two flexible legs are biased inwardly when they are forced against fixed abutments at the base of the unit. Elongated slots must be provided in the housing to accommodate the entire length of the clamping legs which cannot be confined. It will also be seen that the clamping legs are angularly positioned with respect to their directions of travel so that one component of the gripping force is applied to the rear surface of the panel and one component of gripping force is lost. By way of contrast the present invention provides for integrally joined legs that move together axially in a straight, forward motion parallel to the housing. In the present invention the total force of the clamping legs derived from the movement of the lead screw is used for mounting purposes.

Another example of prior art panel mounting structure in this same general field is disclosed in U.S. Pat. 3,090,949, issued on May 21, 1963 to D. M. Hallerberg. In one embodiment disclosed in this patent, flexible legs that extend along two sides of the housing are used to engage the rearward surface of the panel. These legs are cammed outwardly during their forward travel so that this structure suffers the same shortcoming as the Godel patent. The legs in the Hallerberg patent are axially moved by means of two individually actuated captured screws.

To the best of applicants' knowledge there are no examples in the prior art of spring loaded lamp assemblies for use in illuminated pushbutton assemblies.

With particular regard to the relamping structure and method it should be noted that one prior art construction is described in the J. H. Anderson et al. Pat. No. 3,197,-598, dated July 27, 1965. In this patent there is shown an axially moveable center rod having camming portions that outwardly deflect radially positioned spring loaded pins so that the pins engage with apertures in the housing. There is no pull-push-pull method or relamping disclosed. In the Hallerberg patent mentioned above, the lamp and lens assembly is removed by outwardly pulling the lens assembly and then twisting it 90 degrees in order to retract radially extending pins that are normally engaged in apertures in the side walls of the housing. Once again, this is not the pull-push-pull structure that will be described hereinafter.

Accordingly, it is an object of this invention to provide an improved illuminated pushbutton.

It is another object of this invention to provide an illuminated pushbutton having improved panel mounting structure.

Another object of this invention is to provide an illuminated pushbutton having novel structure that facilitates the relamping thereof.

A further object of this invention is to provide an illuminated pushbutton having a lamp assembly that includes spring loaded sleeve members supporting the lamps.

A further object of this invention is to provide an illuminated pushbutton having internal bussing means that eliminate the need for jumper wires.

It is another object of this invention to provide panel mounting means that may be actuated from the front of the panel and which includes four clamping legs that move in a straight line toward the rear surface of the panel and which are actuated by a single member.

A further object of this invention is to provide structure utilized in the relamping procedure, which structure does not require spring biasing means for latching and unlatching the lamp assembly with respect to the housing.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

Figure 1:
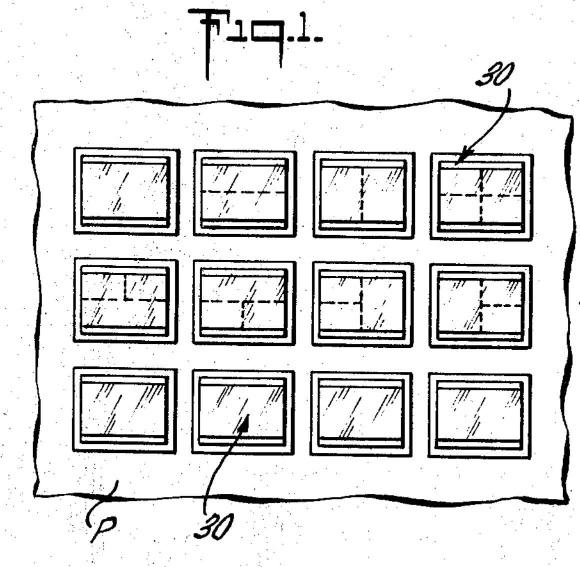
FIG. 1 is a front elevational view of a typical panel in which illuminated pushbutton assemblies of this invention are employed.
Figure 2:
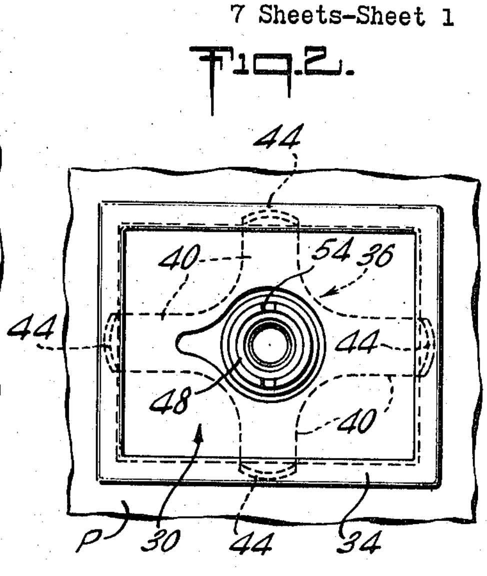
FIG. 2 is an enlarged front elevational view of the FIG. 1 panel showing only one pushbutton housing with the lens and lamp assembly thereof removed.

The environment of the present invention is illustrated in FIG. 1 and FIG. 2 of the drawing. The pushbutton assembly generally designated by the reference character 30 is inserted into panel P from the front side thereof. As will be more fully described and illustrated hereinafter, the panel clamping means, in the form of a centrally located lead screw, is accessible for actuation from the front of the panel.

Figure 3:
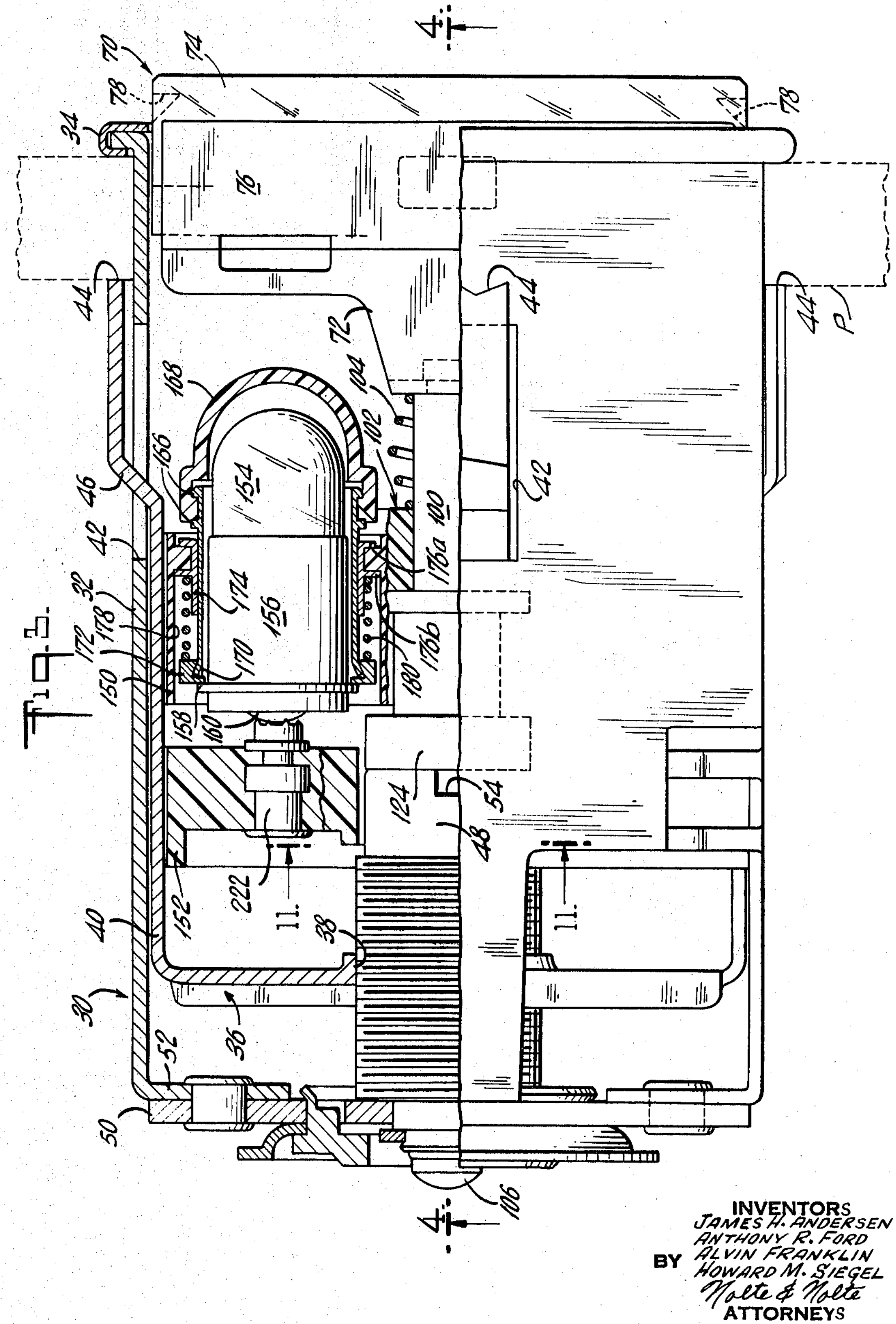
FIG. 3 is an enlarged side elevational view, partially broken away and partially in section, illustrating some of the internal structure of this invention.
Figure 4:
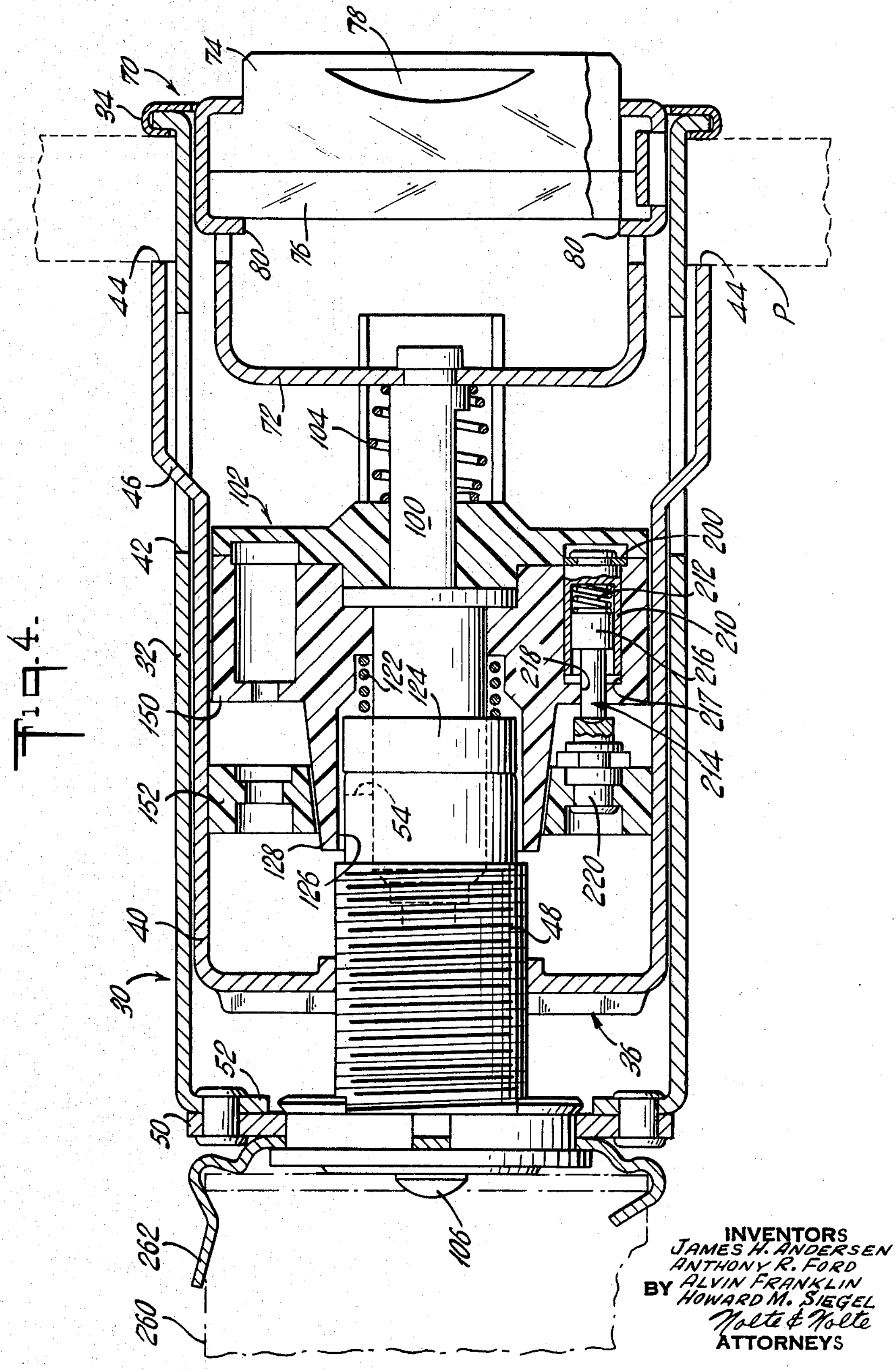
FIG. 4 is a longitudinal sectional view taken along line 4—4 of FIG. 3.

As shown in FIGS. 3 and 4, the pushbutton assembly 30 includes a shell-like housing 32 having an open front end that is bounded by a peripheral flange 34. The opening in the panel P is dimensioned closely to the outside dimensions of the housing and is smaller than flange 34. It should be noted in this embodiment that the housing is rectangular in cross section but this is for purposes of illustration only. Other cross sectional configurations may be used where desired. When the housing is mounted in the panel, flange 34 overlays the front surface of the panel and prevents the further inward movement of the housing. Means to be described later are also provided to grip the rearward surface of the panel so that the pushbutton assembly is firmly held thereon.

As shown in FIGS. 2 and 3, the panel gripping structure is comprised of a yoke 36 that includes a central portion having a threaded aperture 38 therein. Four legs 40 extend radially from the central portion of the yoke and are bent approximately 90 degrees in order to be received within the interior of the housing. The legs extend through apertures 42 in the side walls of the housing and terminate in serrated panel gripping ends 44. A central portion 46 on each leg is formed at an angle to the remainder of the legs so that the panel gripping ends are offset from the remainder of the legs joined to the central portion of the yoke. The legs extend through the apertures in the housing so that the panel gripping ends are outside thereof. When the yoke is moved rearwardly, each offset portion 46 is brought to bear against an edge of its respective aperture and in so doing inwardly deflect the panel gripping ends thereof (FIG. 9) so that they are clear of the panel opening. Thus the opening in the panel need not be substantially larger than the outside dimensions of the pushbutton housing. When the yoke member is moved forward, that is in a direction toward the rear surface of the panel, gripping ends of the clamping legs are allowed to move away from the housing 32 since the offset portions thereof are spaced from the edge of the apertures in the housing. Continued forward motion of the yoke toward the rear surface of the panel will cause the panel gripping ends of the legs to move in a straight, forward direction in order to engage the rear surface of the panel. It should be noted that because of the construction described hereinabove the present invention is adapted to accommodate a range of panel thicknesses extending from 0.020 inch to 0.250 inch. No extra mounting hardware is required and it will be appreciated that there are no loose parts that may easily be lost as was prevelant with the prior structure.

The yoke is moved axially by means of a single, hollow, externally threaded lead screw 48 that is rotatably captured in a zase plate 50 that is rigidly secured to inwardly turned legs 52 of the pushbutton assembly housing. The end of the lead screw facing the front of the panel is provided with a transverse slot 54 so that it may easily be turned by a tool such as a screwdriver from a position in the front of the panel. The yoke is threadably mounted on the lead screw to permit the single screw to axially displace all four legs of the panel gripping members at one time. As mentioned above this may be done from the front of the panel with the lens and lamp assembly removed.

The lens assembly 70 is comprised of a U-shaped support member 72 in which are mounted the front lens 74 and a diffuser 76. The front lens is normally furnished in a clear material and may optionally be engraved on the reverse side with an appropriate message such as "power on." The front lens is additionally provided with notches 78 on the sides thereof to permit removal of the combination lens and lamp assembly in a manner that will be described in greater detail hereinafter. The diffuser is seated directly behind the front lens and diffuses light for clear, uniform illumination. Normally the diffusers are a translucent, white material but for certain applications they may be provided in colors as needed. The two side portions of the U-shaped lens assembly support member 72 are provided with inwardly turned tabs 80 that are positioned directly below the lower surface of the diffuser and which engage the edges thereof in order to hold the front lens and diffuser elements together. Where the particular application of the pushbutton assembly requires a color indication prior to and during lamp illumination a colored translucent screen is used. The illuminated color will be substantially the same as the non-illuminated screen. However, a definite change in intensity appears when the lamps are energized giving a clear indication of the mode of operation.

The lens assembly 70 further includes an elongated shaft 100 extending axially from the bottom thereof. One end of shaft 100 is rigidly secured to the lens assembly support member 72 and the other end of the shaft 100 extends, in the assembled condition, into the hollow interior of lead screw 48. The shaft also extends through a central opening formed in the lamp assembly support member 102 which is keyed within the housing. A compression type return spring 104 is disposed about the shaft 100 and is positioned intermediate the lower part of the lens assembly support member 72 and the confronting surface of the lamp assembly support member 102. In the embodiment being described, the end of the shaft 100 that is disposed within the hollow lead screw is externally threaded in order to receive a shaft extension member 106. It will be seen in FIGS. 5–8 that the extension member 106 is provided with two different longitudinally spaced diameter portions 108 and 110, the purpose of which will be explained hereinafter. When the device is used to actuate a switch it is the free end of the extension 106 to shaft 100 that closes the switch contact.

Figures 10, 11:
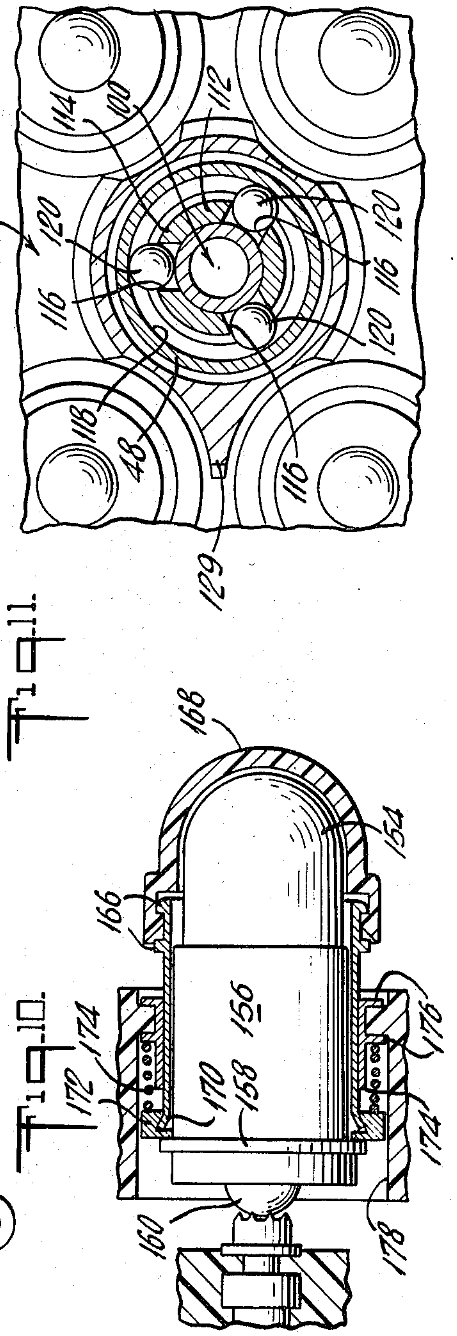
FIG. 10 is a longitudinal sectional view illustrating the spring loaded lamp support means.
FIG. 11 is a transverse sectional view taken along line 11–11 of FIG. 3.
Figures 12, 13:
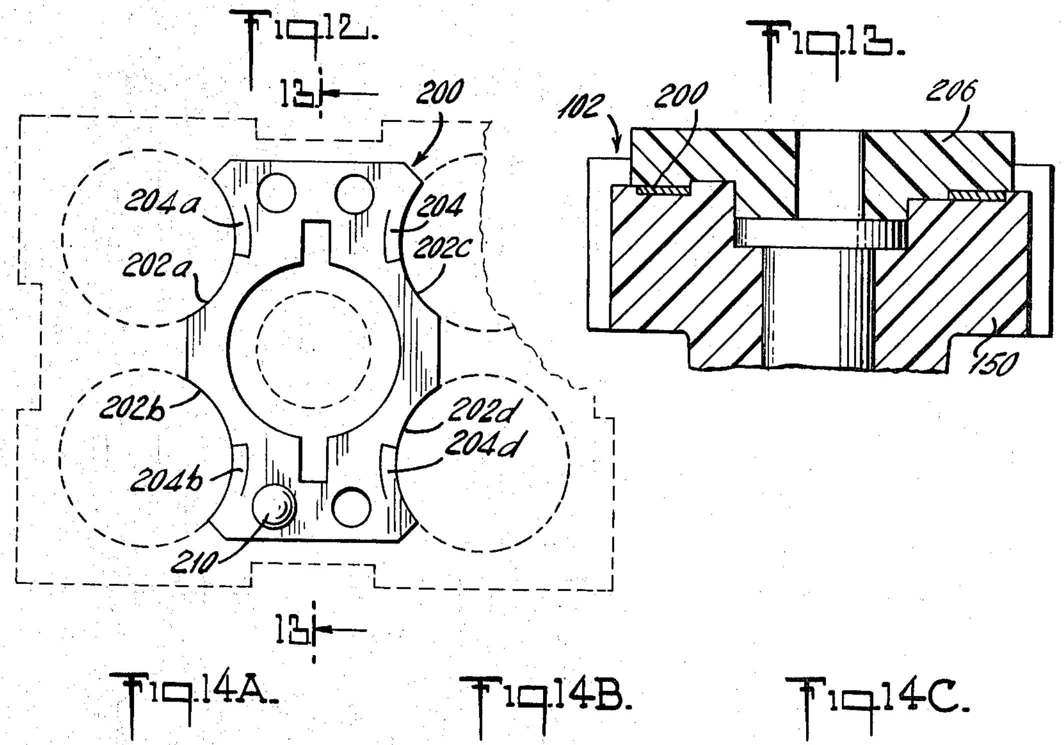
FIG. 12 is a plan view of the integral "grounding" buss bar provided by this invention.
FIG. 13 is a fragmentary sectional elevational view taken along line 13–13 of FIG. 12.

Referring particularly to FIGS. 5–8 it will be seen that a hollow sleeve 112 is disposed about a portion of shaft 100 and is intermediate the ends thereof. An outer, flanged sleeves 114, concentrically disposed about sleeve 112 is captured within the lamp assembly support member 102 at one end and is provided at its opposite end with three radially positioned and equally spaced apertures 116. The apertures 116 are in opposition to an annular groove 118 formed on the inside diameter of lead screw 48 whereby the combination of the apertures 116 and the confronting annular groove 118 are adapted to contain three ball members 120. Keeper ring 122 is disposed about the outside diameter of outer sleeve 114 and is arranged to abut the slotted end of lead screw 48 only when the unit is fully assembled. A compression spring 124 positioned about the outside diameter of outer sleeve 114 biases the keeper ring 122 in the direction of the slotted end of the lead screw. As shown in FIG. 4, in the assembled condition, the slotted end of the lead screw, the keeper ring and the compression spring are all disposed within bore 126 that is formed in extension 128 of the lamp assembly support member 102. As shown in FIG. 11, extension 128 is keyed to the housing by means of rib. 129.

Figures 5, 6, 7, 8:
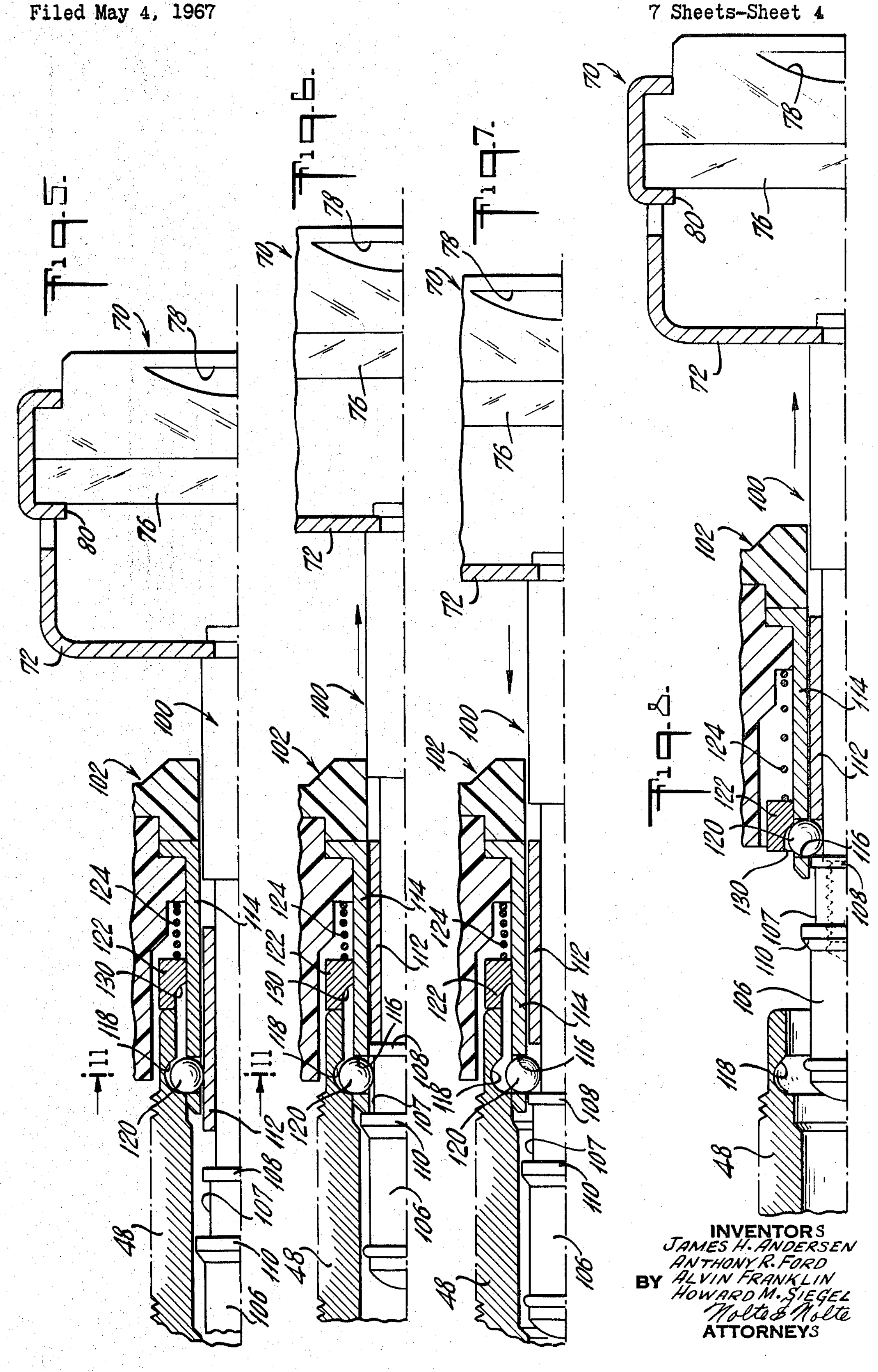
FIGS. 5–8 are fragmentary sectional side elevational views respectively illustrating the fully assembled condition of the structure as well as the first outward pulling step, the inward pushing step and the second outward pulling or lens and lamp assembly removal step.

The method of relamping may be described as utilizing a pull-push-pull movement. The lens assembly 70, the lamp assembly support member 102, sleeves 112 and 114, balls 120, ring 122 and spring 124 are all removed as a unit. When the lens and lamp assembly is fully inserted, it assumes the position shown in FIGS. 3, 4 and 11. Balls 120 are simultaneously positioned in apertures 116 and in annular groove 118. The lens assembly may be axially displaced by pressing on the front surface thereof. It will be seen that shaft 100 moves freely in an axial direction to the left so that extension 106 thereof may make contact with the switch actuator. Movement of the shaft 100 does not cause axial displacement of sleeve 112 which at this time is positioned radially inward of, and in fact supports, the balls 120 (FIG. 5). It should be noted that the force on the outer surface of the lens assembly at least partially compresses return spring 104 and removal of the external force permits spring 104 to return the lens assembly to its normal position (FIGS. 3 and 4).

When the front lens assembly 70 is gripped at notches 78 and pulled outwardly, in the direction away from the front surface of the panel, diameter 108 abuts and pushes the left hand end of sleeve 112. At this time sleeve 112 is pushed so that its right hand end (FIG. 6) approaches an internal shoulder in the lamp assembly support member and the diameters 108 and 110 on shaft extension 106 straddle the transverse axis of the balls. In effect then the balls are transferred from the outer diameter of sleeve 112 to the diameter 107 of shaft extension 106 that is intermediate diameters 108 and 110.

When the lens assembly is pushed inwardly, toward the front surface of the panel as the second step of the relamping method, the sleeve 112 which is free floating about shaft 100 remains substantially in its second position (FIG. 7). It should be noted that diameter 108 on extension 106 is slightly smaller than the outside diameter of sleeve 112. This provides that sleeve 112, though free floating, will remain substantially in its second position. The balls will "catch" the edge of sleeve 112 because of the diameter differences. Because sleeve 112 is free floating, it is important the balls catch the edge of sleeve 112. Otherwise the sleeve might not stay substantially in its second position. Thus, movement of the lens assembly and shaft to the left will permit the balls to ride over diameter 108 and catch the edge of sleeve 112. Because the balls have inward forces on them, provided indirectly by spring 124 and lamp springs 180, they actually push or cam sleeve 112 out of the way while the balls move inwardly to the smaller diameter of shaft 100.

It will be seen in FIGS. 7 and 8 that the balls are now completely free of the annular groove and the lens assembly may now be pulled to the right or in a direction away from the front surface of the panel carrying with it all the components mentioned above.

It should also be recognized that diameter 108 need not be greater than diameter 107 for the mechanism to function. Referring to FIG. 6, the reason diameter 108 is shown as being greater than diameter 107 is to provide an abutment over which the balls must ride and therefore to provide a "stop" or "force" which must be overcome during the second or "push" stage of relamping. This in turn increases the shock and vibration capabilities of the unit. If the unit was shocked to the point where the lens assembly popped out to the 1st or "pull" stage and there was no abutment to overcome the 2nd or "push" stage, the chances are excellent that the lens assembly would fall out of the housing 32. The abutment diameter 108 prevents this.

When the lens assembly and lamp assembly support member are removed from the housing, the balls are captured in the apertures 116 provided in outer sleeve 114 as well as by the keeper ring 122. An internal arcuate shoulder 130 in keeper ring 122 limits radial movement of the balls and the balls themselves prevent further axial movement of the ring.

To insert the lens assembly and lamp support member, shaft 100 is inserted into the housing and the lens assembly is pushed towards the front surface of the panel.

Referring to FIG. 8, it should be noted that some limited axial movement of the lens assembly and attached plunger shaft 100 within the lamp assembly support 102 is possible. The movement distance is that space between the right hand end of sleeve 112 and the shoulder on shaft 100 just to the right of sleeve 112. Except for this limited movement the unit is substantially in a locked position. FIG. 8 could just as well show the shoulder on shaft 100 against the sleeve 112 and then the movement distance or "play" would be between the shoulder 108 and the balls 120. Though academic, this latter position is actually where the parts are relative to each other as soon as the top of screw 48 comes in contact with ball keeper 122. When this happens, keeper 122 moves to the right on sleeve 114, spring 124 exerts an increasing force since it is being compressed, and consequently there is an increasing force outwardly on the balls due to sleeve 112 which is being pushed by the shoulder on shaft 100. Further depressants puts the ball keeper 122 well back on shaft 114, but now the balls 120 are contained within the upper diameter of screw 48 and still the unit is locked. Finally the balls reach the position of the annular groove 118 and at this point are forced outward into the groove by the left end of sleeve 112 as it slides underneath the balls. The unit is now in its inserted position and return spring 104, which was very slightly compressed at the very end of the insertion process, returns the lens assembly and shaft 100 to its normal position (FIG. 1). The intermediate step of transferring the balls to the diameter of shaft extension 106 is omitted on the lamp and lens assembly insertion step.

Figure 21:
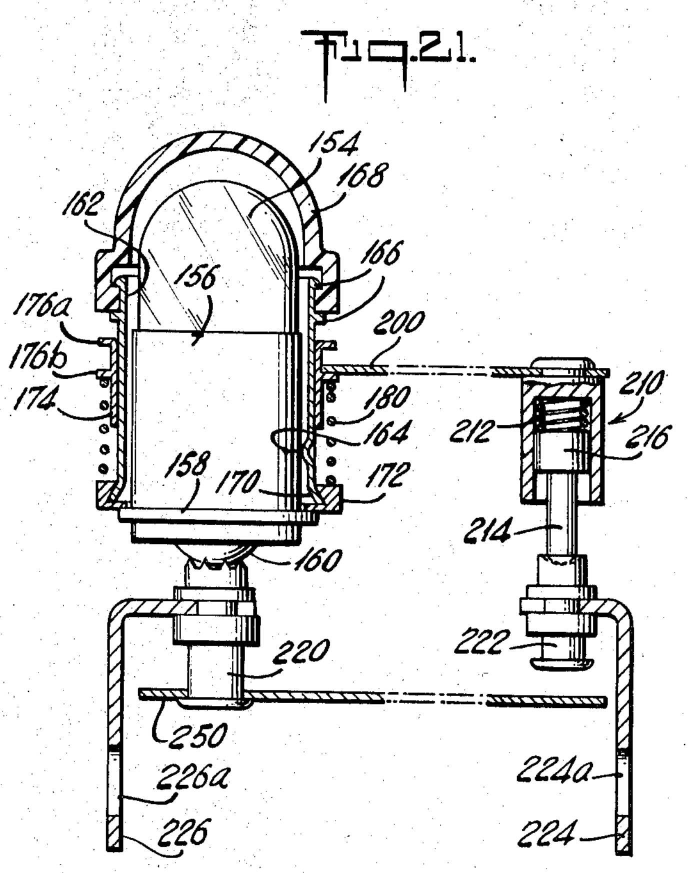
FIG. 21 is a schematic sectional elevational view illustrating means for connecting the lamp terminals to a source of power.

FIG. 21 will now be used to explain the electrical connections made to the lamps. For purposes of clarity the molded plastic lamp support base and the molded plastic terminal block have been omitted. These last two elements are designated by reference characters 150 and 152 (FIGS. 3 and 4). For the purpose of this discussion, the two connections made to only a single typical lamp will be described. The various circuits possible with the present invention will become apparent from the description hereinafter made in connection with FIGS. 15A–15C.

Lamp 154 has two convnetional terminals, one of which is the metal jacket 156 provided with a flange 158 and the other is the metallic central base portion 160. The lamp is received in a hallow metal inner sleeve 162 having inwardly directed protrusions 164 adapted to releasably engage jacket 156. Axially spaced flanges 166 at the upper end of the sleeve are arranged to grip a transluscent, colored filter member 168 that surrounds the lamp filament. At its lower end sleeve 162 is flared outwardly to define a lip 170. Annular ring member 172 seats on lamp flange

158 and is provided with an internal undercut to receive lip 170.

Inner sleeve 162 is slidably contained in a close fitting outer metal sleeve 174 having a pair of spaced upper and lower axial flanges **176*a*, 176*b* respectively at its upper end. The outer sleeve is nonmovably captured in aperture 178 provided in the lamp support base 150 as shown in FIGS. 3 and 10. As will be explained hereinafter the outer lamp sleeve is retained over an arc of approximately 270°. Finally a compression spring 180 is disposed about outer lamp sleeve 174 intermediate the lower flange 176*b* and ring member 172 and within aperture 178**. A comparison of FIGS. 3 and 10 illustrate that a wide range of lamp tolerances can easily be accommodated while still retaining the resilient mounting feature of the lamps.

To assemble each lamp the outer sleeve is first secured to the lamp base and then the spring is inserted from the underneath. The inner sleeve is then put into place and the ring member is positioned around the bottom end thereof. When the bottom end of the inner sleeve is outwardly deformed (lip 170) the annular ring and the spring are captured within the lamp base support and yet the inner sleeve, together with the lamp are resiliently supported for limited axial movement. The lamp filter is a thin pliable material such as rubber, for example, that is removably snapped into place preferably before the lamp is mounted.

Figure 22:
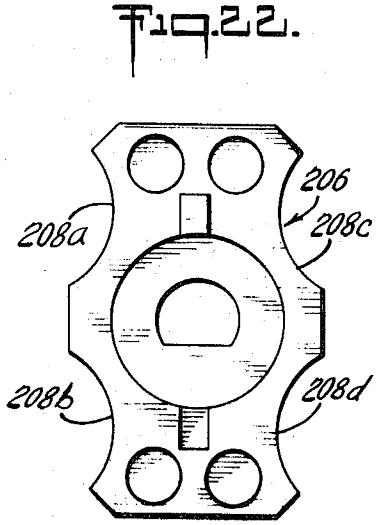
FIG. 22 is a plan view of the insert member used on the lamp and lens support assembly.

As shown in FIGS. 4, 12, 13 and 21 buss bar 200 is a generally rectangular metallic plate having arcuate notches **202*a*, 202*b*, 202*c* and 202*d* each approximately 90° in length and each provided with a slightly bent tab portion 204*a*, 204*b*, 204*c* and 204*d* respectively. In the assembled condition, FIG. 21 for example, the arcuate notches are in intimate electrical contact, by means of the bent tabs, with the upper surface of outer sleeve flange 176*b*. The buss bar is secured in place by a similarly shaped plastic insert member 206 (FIG. 22) having corresponding side notches 208*a*, 208*b*, 208*c* and 208*d* which in combination with the thickness of the buss bar completely fills the space between flanges 176*a* and 176*b*** of the outer sleeve.

Electrical connection is made to the "grounded" side of each lamp through the portion of the buss bar 200 that is in contact with inner sleeve 162 via outer sleeve 174. A hollow metallic stud 210 associated with each lamp is riveted to buss bar 200 and contains a compression spring 212 and a pin 214 having an enlarged end portion 216 (FIGS. 4 and 21). As shown particularly in FIG. 4 stud 210 is positioned in blind hole 217 in lamp support base 150 and is captured by means of insert member 206. The shank of the pin extends through a reduced diameter opening 218 (FIG. 4) in the lamp support base so that the grounding terminal of each lamp is also resiliently mounted.

FIGS. 17 and 19–21 illustrate the means for electrically connecting the lamp terminals to a suitable source of power (not shown). A plurality of pins 220 and 222 are secured in terminal block 152 and in the assembled condition are in physical contact with pins 214 and lamp base portion 160 respectively. Each pin has its own bent terminal 224 and 226 respectively in which there are apertures **224*a* and 226*a* for securing lead wires. It will be appreciated that while pins 220, 222 and terminals 224 and 226 are rigidly secured in the terminal block and are not removed with the lens and lamp assembly the lamp terminals 160 and 214** are resiliently mounted in the removable lamp support block relative to the fixed terminals.

Figure 14A:
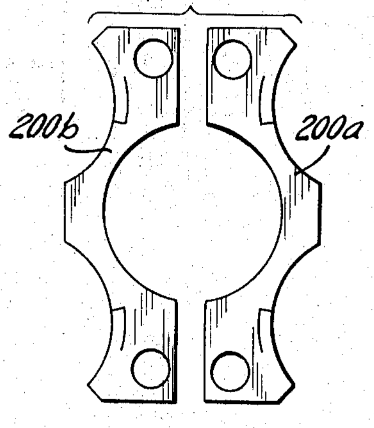
FIGS. 14A, 14B and 14C are plan views illustrating several alternative configurations of the "grounding" buss bar shown in FIG. 12.
Figure 14B:
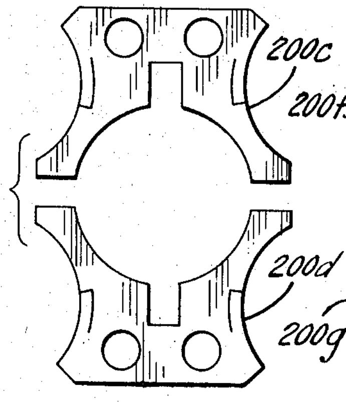
Figure 14C:
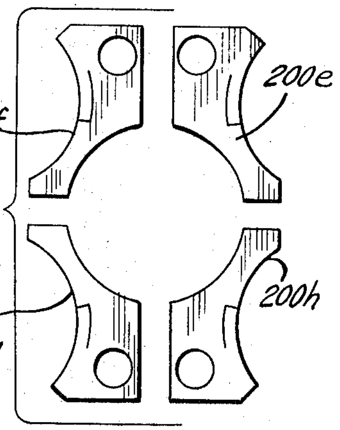
Figures 16, 17, 18A, 18B, 18C, 19, 20:
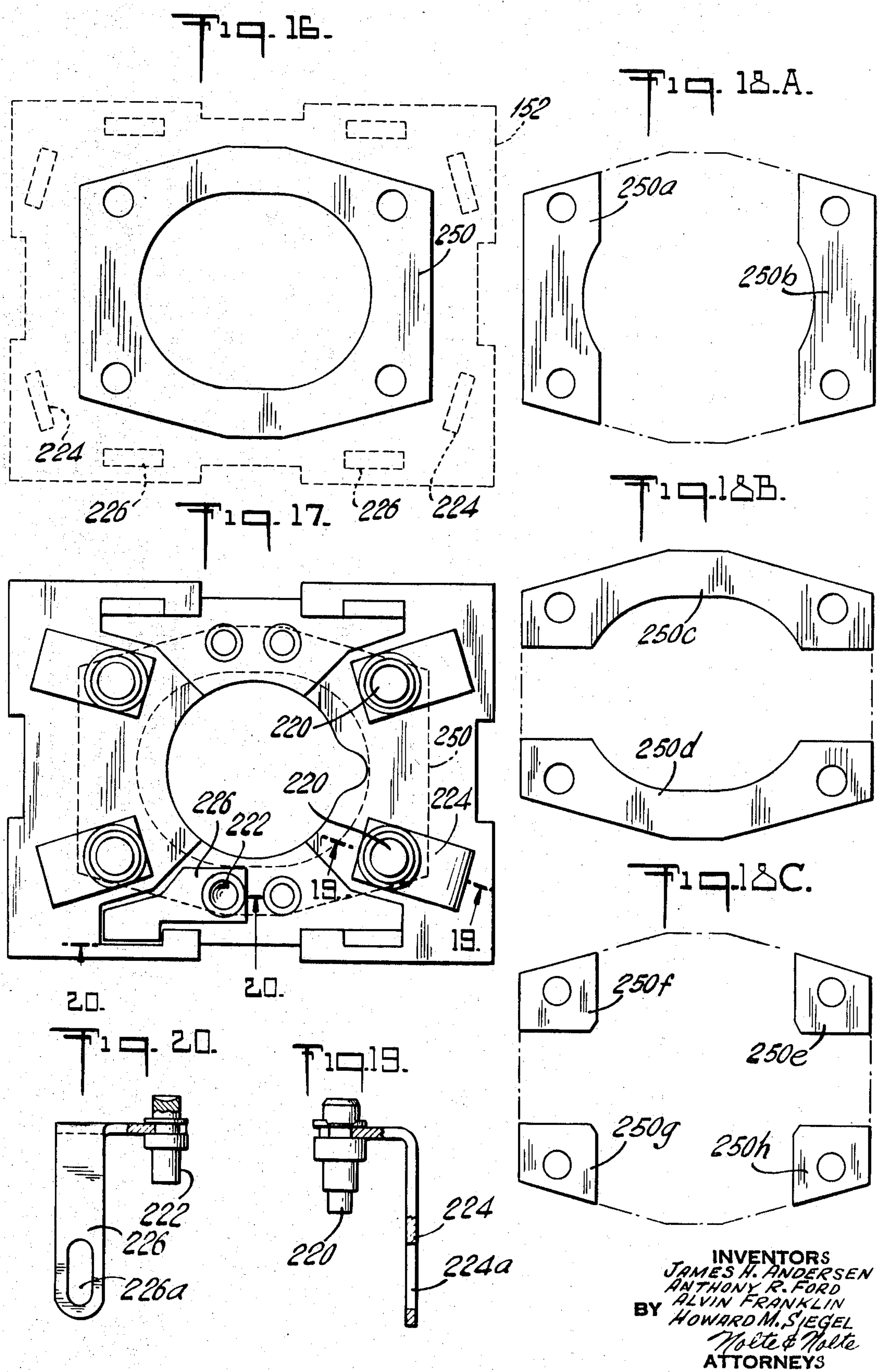
FIG. 16 is a plan view of the integral "hot" buss bar provided by this invention.
FIG. 17 is a plan view similar to FIG. 16 showing the "hot" buss bar and several of the terminals associated therewith.
FIGS. 18A, 18B and 18C are plan views illustrating several alternative configurations of the "hot" buss bar shown in FIG. 16.
FIG. 19 is an elevational view, partly in section and taken along line 19—19 of FIG. 17, showing one of the terminals used therein.
FIG. 20 is an elevational view, partly in section and taken along line 20—20 of FIG. 17, illustrating the other type of terminal used therein.

Several possible configurations of buss bar 200 are shown in FIGS. 12 and 14A–14C. Depending upon the application, the buss bar is provided as a single piece (FIG. 12), in two different sections **200*a* and 200*b* (FIG. 14A) or 200*c* and 200*d* (FIG. 14B) or in four pieces 200*e*, 200*f*, 200*g* and 200*h* (FIG. 14C). Where the buss bar is common to all four lamps only one stud 210 and grounding terminals 222, 226 need be provided (FIG. 17). Two studs 210 and terminals 222, 226 are required in each of the embodiments of FIGS. 14A and 14B and four grounding terminals 222, 226 together with four studs 210** are used in FIG. 14C. The selection of the quantity and electrical connection of the grounding terminals is in accordance with the requirements of the user and is made at the factory at the time of fabrication.

Figure 15A:
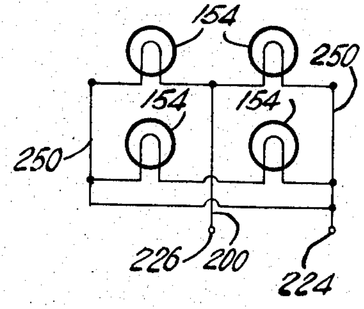
FIGS. 15A, 15B and 15C are circuit drawings for the application of the buss bars used in this invention.
Figure 15B:
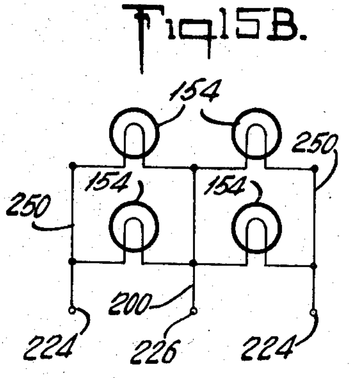
Figure 15C:
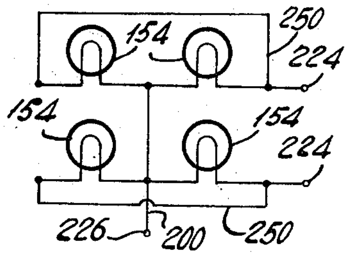

FIGS. 15A–15C, FIG. 16 and FIGS. 18A–18C illustrate several possible configurations of the "hot" buss bar 250 that is in electrical contact with the base of each lamp via pins 220. If all four lamps have a common "hot" buss bar then only one terminal 224 is required (FIGS. 15A and 16). Alternatively, buss bar sections 250*a* and 250*b* (FIG. 18A) could be supplied to provide the circuit shown in FIG. 15B or the buss bar could be made in sections 250*c* and 250*d* (FIG. 18B) to provide the circuit shown in FIG. 15C. Although it is possible to use the buss bar as shown in FIG. 18C wherein there are four sections 250*e*, 250*f*, 250*g* and 250*h*, such construction would not function as a conventional buss bar. In this last application (not illustrated by a circuit) four terminals 224 are required. As with the grounding buss bar, the "hot" buss is fabricated at the factory in accordance with the users requirements and eliminates the need for field installed jumper wires.

The following is a tabulation of various configurations available with the aforementioned structure:

| Terminals | Ground | Inputs | Display |
|---|---|---|---|
| 5 | Common | | |
| 6 | Dual | | Horizontal. |
| 6 | do | | Vertical. |
| 8 | Separate | | |
| 2 | Common | Common | |
| 3 | do | Vertical split | Vertical. |
| 4 | Dual | Horizontal split | Full or horizontal. |
| 4 | do | Vertical split | Vertical display. |
| 3 | Common | Horizontal split | Full or horizontal. |

Each lens may be lit with 1, 2, 3 or 4 different colors. The colors may be alike or different in all four quadrants. The colors may be also different in the two pairs of vertical or horizontal quadrants. Still other possibilities are to have two horizontal or two vertical quadrants the same color and the remaining two quadrants illuminated in two different colors.

Figure 9:
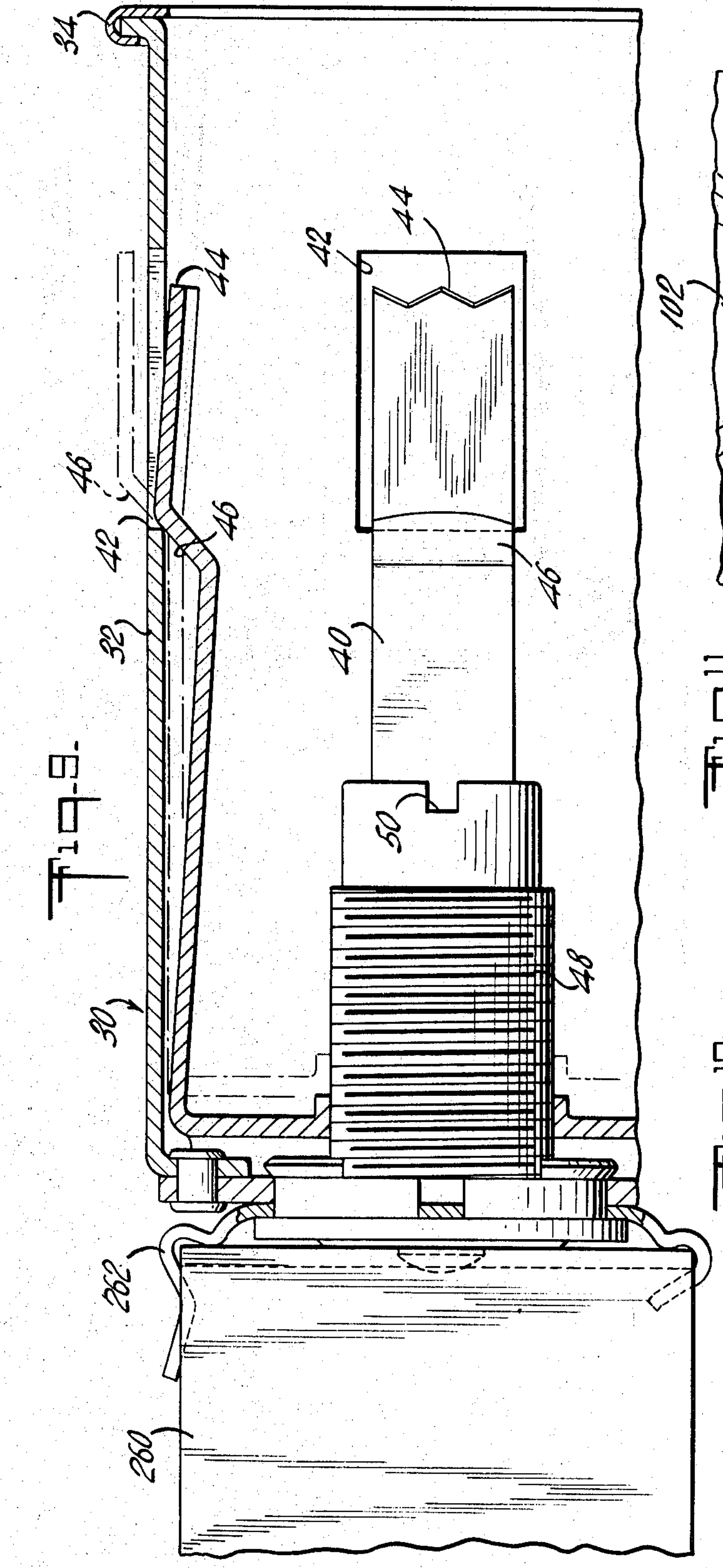
FIG. 9 is a fragmentary sectional side elevational view illustrating the panel clamping means.

A plurality of switches 260 may be installed by inserting them in bracket 262 that is secured to the rear of the housing (FIGS. 4 and 9). The switches may have a snap-drive mechanism for momentary or for push-on/push-off alternate action. The drive for the second type of switch is based on an over-the-center mechanism with a prestressed, coiled spring toggle that assure positive transfer. Although not specifically illustrated, the structure described above may easily be converted to electrical lock-in units by the addition of a snap-on magnetic coil placed between the housing and the switcher. The used of the coil enables individual or groups of lighted push button assemblies to be electrically interlocked.

The aforementioned description provides structure that is economical, easy to install and simple to change. A wide range of display styles, color coding and messages can easily be replaced, changed or modified in the field. The device can be used either as a lighted push button switch or an as indicator light with the conversion accomplished by the simple addition or removal of a limit plate at the rear of the basic unit. Circuit versatility permits illumination of each of a pluralty of lamps with a single control. Thus the panel operator is made instantly aware of single and/or multiple status changes.

The housing is secured to and removed from the mounting panel from a position in front of the panel. A single screw, accessible from the front, clamps the housing to the panel at four points. There is no loose hardware involved. The lamps are internally bussed at the factory in accordance with the users specification thus avoiding costly and potentially damaging field installation of jumper wires. The internal bussing also reduces the number of solder connections. Spring loaded lamps allow the solder terminal and lamp contacts to be of the non-moving type and therefore not subject to damage commonly incurred by hot soldering irons, solder flux, etc. In addition the spring loaded lamp sockets eliminate the usual lamp-to-terminal continuity problem. This structure adjusts automatically for lamp contact tolerances and remains stationary during activation. Finally, the pull-push-pull method of relamping is very positive and yet very simple so that the individually mounted lamps and filters can be changed without disturbing the others.

There has been disclosed heretofore the best embodiment of the invention presently contemplated. It is to be understood however that various changes and modifications may be made by those skilled in the art without departing from the spirit of the invention.

We claim:

1. In a panel mounted assembly having a hollow flanged, open fronted housing extending through the panel, improved mounting means for the housing comprising:

(a) a lead screw rotatably supported in the housing; said screw being accessible for actuation from a position in front of the panel;

(b) a yoke threadably mounted for axial movement on said lead screw;

(c) a plurality of clamping legs integral with said yoke and extending parallel to the longitudinal axis of said lead screw, said legs passing through relatively small openings in the side walls of the housing whereby the free ends thereof engage the rear surface of the panel in a manner whereby said free ends are perpendicular to said panel; and (d) camming means integral with said legs and coacting with the side walls of the housing whereby turning said crew in one angular direction retracts and deflects said legs inwardly to a limited degree permitting the housing to be inserted in the panel and turning said screw in the opposite angular direction andvances said legs on the outside of the housing in a plane parallel to the longitudinal axis of said screw and in a direction towards the rear surface of the panel for engagement therewith, said legs being directly behind the housing flange.

2. In a lighted indicator assembly having a housing adapted to be supported on a panel, a terminal rigidly secured in the housing and a removable lamp assembly including a base member and at least one lamp having a flange thereon, improved lamp mounting means comprising:

(a) an outer sleeve rigidly secured to the base member;

(b) an inner sleeve slidably disposed in said outer sleeve for axial movement therein, said inner sleeve having an outwardly flared lip, an annular ring seated on said lamp flange and being provided with an internal groove to retain said lip therein; and (c) spring means resiliently biasing said inner and outer sleeves with respect to each other, said inner sleeve being in abutment with said annular ring whereby the lamp is resiliently supported with respect to the rigid terminal and thereby adjusts for tolerances in the lamp base.

3. In a lighted pushbutton assembly having a housing and a removable lamp assembly including a base member and at least one lamp mounted thereon, improved means for removing said base member comprising: (a) an elongated member integral with the base member; (b) locking means disposed in the housing and inwardly spaced from the side walls thereof, said locking means comprising a shaft secured to the inner end of said lens assembly and extending into said housing, a first hollow sleeve surrounding a portion of said shaft and axially movable therealong, at least two shoulders on said shaft, a second hollow sleeve surrounding said first sleeve, said second sleeve being secured to said housing and having a plurality of apertures extending radially through the wall thereof, a radially movable ball located in each of said apertures, a hollow member fixed to said housing and having an annular groove to receive said balls, and a keeper member to retain said balls in said apertures; and (c) means to transfer said locking means from the housing to said elongated member whereby the base member and lamp are removed as a unit with said elongated member.

4. The device in accordance with claim 1 wherein said housing includes an elongated section and limiting means preventing movement of said housing rearward of the front face of the panel, said clamping legs each having a front end extending through said elongated section, said front ends of said legs being movable between a first position in clamping engagement with the rear face of the panel and a second, retracted position, said legs being flexible whereby the front ends thereof may be depressed to be within the confines of said housing in said second position.

5. The device in accordance with claim 4 wherein said housing includes a central, axially extending lead screw rotatably captured therein and accessible from the open, front end thereof, said clamping legs having a common base threadably mounted on said screw whereby rotation of said lead screw causes substantially linear movement of said legs between said first and second positions.

6. The device in accordance with claim 5 wherein each said leg includes first and second portions and a camming surface interconnecting said first and second portions, each said camming surface bearing against said housing when said legs move from said first to said second position whereby said ends of said legs are deflected inwardly at least flush with the outside of said housing.

7. The device in accordance with claim 6 wherein said first and second portions of each said leg are offset from and substantially parallel to each other, said camming surface extending angularly between said first and second portions.

8. The device in accordance with claim 6 wherein the front end of each said leg is serrated.

9. The device in accordance with claim 6 wherein said housing includes an aperture proximate the front end thereof, at least a portion of said legs being movable through the apertures when said screw is rotated and said clamping means moves from one of said positions to the other of said positions.

10. The device in accordance with claim 23 wherein said shaft includes a third shoulder axially spaced from one said two other shoulders to define a space on the diameter of said shaft in which said balls rest during axial movement of said lens assembly to an unlocked position.

11. The device in accordance with claim 10 wherein said shaft includes first and second coaxial portions secured to each other, two of said shoulders being formed integrally with one of said shaft portions, said third shoulder being formed integrally with said other shaft portion, said three shoulders being diameters larger than and concentric with said shaft and axially spaced apart.

12. The device in accordance with claim 23 wherein said means to retain said balls in said apertures is an annular keeper ring surrounding a portion of said second sleeve and normally in abutment with said hollow, fixed member when said lens assembly is disposed in said housing.

13. The device in accordance with claim 12 wherein said keeper ring includes means abutting said balls to prevent axial movement of said keeper ring beyond said balls when said lens assembly is removed from said housing.

14. The device in accordance with claim 12 wherein there is included spring means normally urging said keeper ring axially in the direction of said balls.

15. In a lighted indicator assembly having a housing adapted to be supported on a panel, a lamp assembly including a base member supporting a plurality of lamps each having first and second contacts integral therewith, improved electrical connection leads comprising: an insulating block disposed within the housing, a plurality of terminals secured in said block, each of said terminals being associated with one of the first lamp contacts, each of said lamps being of the type including a metal jacket having a projection thereon defining a first electrical contact and a metallic portion on the base thereof defining a second electrical contact, said mounting means comprising an inner metallic sleeve at least a portion of which is in electrical contact with the lamp jacket, said inner sleeve including means in abutment with the said projection of the lamp jacket, an outer sleeve in slidable electrical contact with said inner sleeve, said outer sleeve having at least a portion thereof rigidly secured in said insulating block, said means resiliently supporting said mounting means being interposed between portions of said inner and outer sleeve whereby said inner sleeve is biased with respect to said outer sleeve, a buss bar in said block, said buss bar being selectively connected electrically to said terminals, mounting means for said lamps, and means resiliently supporting said mounting means in said insulating block.

16. The device in accordance with claim 15 wherein said inner sleeve includes a translucent, colored filter member positioned to substantially enclose the light emitting portion of the lamp and means to secure said filter member to said inner sleeve.

17. The device in accordance with claim 15 wherein said inner sleeve means in abutment with the lamp projection is comprised of an outwardly flared end portion and an annular member having an internal undercut diameter to grippingly receive said outwardly flared end portion and a radially inward extending flange arranged to seat loosely on the projection of the lamp jacket.

18. The device in accordance with claim 24 including a second buss bar electrically connecting selected ones of said second terminals.

19. The device in accordance with claim 24 including a second insulating block immovably secured in said housing, said first and second terminals being rigidly secured in said second insulator block.

20. The device in accordance with claim 24 wherein said first insulator block includes an aperture therein and said first terminal means includes a hollow metallic stud located in said aperture, said stud being in electrical contact with said first buss bar, a metallic pin slidably captured in said hollow stud and means in said hollow stud resiliently biasing said pin with respect to said stud.

21. The device in accordance with claim 24 including an insert member securing said first buss bar to said first insulator block.

22. The device as claimed in claim 10 wherein the diameter between said third shoulder and said one of the two other shoulders is smaller than the diameter of said first hollow sleeve and larger than the diameter of said shaft.

23. An illuminated, panel-mounted indicating device comprising in combination: a hollow housing having an open front end, clamping means integral with said housing and arranged to secure said housing to said panel, a lens assembly disposed at the open end of and extending into said housing, said lens assembly being limited to axial movement only, locking means for locking and unlocking said lens assembly within said housing, said locking means being enclosed within said housing and spaced from the wall thereof, lamp support means carried by said lens assembly, said locking means comprising a shaft secured to the inner end of said lens assembly and extending into said housing, a first hollow sleeve surrounding a portion of said shaft and axially moveable therealong, at least two shoulders on said shaft, a second hollow sleeve surrounding said first sleeve, said second sleeve being secured to said lamp support means and having a plurality of apertures extending radially through the wall thereof, a radially moveable ball located in each of said apertures, a hollow member fixedly secured to said housing and having an annular groove to receive said ball, and a keeper member to retain said ball in said aperture.

24. An illuminated, panel-mounted indicating device comprising in combination: a hollow housing having an open front end, clamping means integral with said housing and arranged to secure said housing to said panel, a lens assembly disposed at the open end of and extending into said housing, said lens assembly being limited to axial movement only, locking means for locking and unlocking said lens assembly within said housing, said locking means being enclosed within said housing and spaced from the wall thereof, lamp support means carried by said lens assembly, said locking means comprising a shaft secured to the inner end of said lens assembly and extending into said housing, said lamp support means including an insulating block integral with and carried by said locking means, mounting means for at least one lamp, and means resiliently supporting said mounting means in said insulating block, each of said lamps including a metal jacket having a projection thereon and defining a first electrical contact and a metallic portion on the base thereof defining a second electrical contact, said mounting means comprising an inner metallic sleeve at least a portion of which is in electrical contact with the lamp jacket, said inner sleeve including means in abutment with the projection of the lamp jacket and an outer sleeve in slideable electrical contact with said inner sleeve, said outer sleeve having at least a portion thereof rigidly secured in said insulating block, said means resiliently supporting said mounting means being interposed between portions of said inner and outer sleeves whereby said inner sleeve is biased with respect to said outer sleeve, and a buss bar electrically connecting selected ones of said lamp support means, said buss bar being in electrical contact with said outer sleeves there being further included first terminal means electrically connected to said buss bar and the first contact of selected ones of the lamps and second terminal means electrically connected to the second contact of selected ones of said lamps, said first and second terminals being adapted to be connected to a source of electrical power.

References Cited

UNITED STATES PATENTS

| | | | |
|---|---|---|---|
| 3,090,949 | 5/1963 | Hallerberg | 340—381X |
| 3,233,299 | 2/1966 | Godel | 220—3.6X |
| 3,276,014 | 9/1966 | Rueger | 340—381 |

THOMAS B. HABECKER, Primary Examiner

M. SLOBASKY, Assistant Examiner

U.S. Cl. X.R.

220—3.6